US011686636B2

(12) United States Patent
Olszewski (10) Patent No.: US 11,686,636 B2
(45) Date of Patent: *Jun. 27, 2023

(54) BELT TENSION MEASURING SYSTEM AND METHOD

(71) Applicant: Reliability Concepts LLC, Coldwater, MI (US)

(72) Inventor: Michael A. Olszewski, Coldwater, MI (US)

(73) Assignee: RELIABILITY CONCEPTS LLC, Coldwater, MI (US)

( * ) Notice: Subject to any disclaimer, the term of this patent is extended or adjusted under 35 U.S.C. 154(b) by 275 days.

This patent is subject to a terminal disclaimer.

(21) Appl. No.: 17/183,745

(22) Filed: Feb. 24, 2021

(65) Prior Publication Data

US 2021/0302250 A1   Sep. 30, 2021

Related U.S. Application Data

(63) Continuation-in-part of application No. 16/943,703, filed on Jul. 30, 2020, now Pat. No. 10,962,428.

(60) Provisional application No. 63/001,089, filed on Mar. 27, 2020.

(51) Int. Cl.
*G01L 5/04* (2006.01)
*G01L 5/102* (2020.01)
*G01L 5/105* (2020.01)

(52) U.S. Cl.
CPC .............. *G01L 5/047* (2013.01); *G01L 5/102* (2013.01); *G01L 5/105* (2013.01)

(58) Field of Classification Search
CPC .......... G01L 5/047; G01L 5/102; G01L 5/105
See application file for complete search history.

(56) References Cited

U.S. PATENT DOCUMENTS

| 3,171,278 | A | 3/1965 | Howard, Jr. |
| 3,391,574 | A | 7/1968 | Howard |
| 3,484,807 | A | 12/1969 | Roden |
| 3,596,508 | A | 8/1971 | Howard |
| 3,698,244 | A | 10/1972 | Deming |

(Continued)

FOREIGN PATENT DOCUMENTS

| CN | 101666695 B | 4/2011 |
| CN | 108072474 A | 5/2018 |

(Continued)

*Primary Examiner* — Alexander A Mercado
*Assistant Examiner* — John M Royston
(74) *Attorney, Agent, or Firm* — Dinsmore & Shohl LLP (57) ABSTRACT

A method of checking belt tension of a belt extending between pulleys includes providing a reference indicator defining a reference position relative to the upper surface of the belt in an undeflected state. A force/probe assembly is provided and is operable to measure a force applied to the distal end. The distal end is positioned on the upper surface of the belt and a force is applied generally perpendicular thereto. The belt may be deflected a predetermined distance, as determined by a change in position of the assembly relative to the reference indicator, and the force is measured, or a force is applied until the force is equal to a predetermined force, and the deflection of the belt is determined by a change in position of the force/probe assembly. The belt tension is determined based on the force and distance during the deflecting step.

18 Claims, 5 Drawing Sheets

(56) References Cited

U.S. PATENT DOCUMENTS

| | | | |
|---|---|---|---|
| 3,839,908 A | 10/1974 | Casper | |
| 4,362,062 A | 12/1982 | Peterson | |
| 5,156,054 A | 10/1992 | Mikulencak | |
| 5,959,220 A | 9/1999 | Jun | |
| 7,373,837 B2 | 5/2008 | Ellsworth et al. | |
| 10,393,602 B2 | 8/2019 | D'Sa et al. | |
| 2006/0100052 A1* | 5/2006 | Drayer | D07B 1/18 474/242 |
| 2015/0068318 A1* | 3/2015 | Bardin | H04Q 9/00 73/828 |
| 2015/0247769 A1* | 9/2015 | Miyata | G01L 5/042 702/56 |

FOREIGN PATENT DOCUMENTS

| | | |
|---|---|---|
| DE | 8202570 U1 | 7/1982 |
| GB | 2489427 B | 7/2016 |
| JP | S58115335 A | 7/1983 |
| KR | 19980025894 U | 8/1998 |
| WO | 2010145854 A1 | 12/2010 |

\* cited by examiner

BELT TENSION MEASURING SYSTEM AND METHOD

CROSS REFERENCE TO RELATED APPLICATIONS

This application is a continuation in part of and claims priority to U.S. Utility patent application Ser. No. 16/943,703, filed Jul. 30, 2020, which claims priority to U.S. Provisional Patent Application 63/001,089 filed Mar. 27, 2020, the entire content of which is incorporated herein by reference.

FIELD OF THE INVENTION

The present invention relates to systems and methods for measuring belt tension in a system including a belt extending over two or more pulleys.

BACKGROUND OF THE INVENTION

Many mechanical systems utilize two or more pulleys with a belt extending over the pulleys to transmit power. It is important that the belt be tensioned properly. Too little tension increases wear and reduces power transmission capacity and too much tension reduces belt life and increase bearing wear. There are a wide variety of systems and methods intended to assist in the measurement of belt tension, but they are generally difficult or complicated to use, or provide inconsistent results. As such, there is a need for additional systems and methods.

SUMMARY OF THE INVENTION

The present invention provides a system and method for measuring belt tension in a system having a belt extending over two or more pulleys, with a span defined between the pulleys. In an embodiment, a reference indicator is provided to define a reference position relative to an upper surface of the belt in an undeflected state. This reference indicator may take various forms, with an exemplary version including one or more laser alignment elements which project laser light in a plane. The light defines the reference position. In an example, the laser alignment elements are attached to the pulleys and are positioned to project light at each other generally in the same plane. A probe element has a distal end used to apply a force generally perpendicularly to the upper surface of the belt at a midpoint of the span. The probe element has measurement markings thereon and as the probe element is used to apply force to the belt, the position of these measurement markings moves relative to the reference position, thereby allowing a user to determine how much the belt has been displaced. The probe element is connected to a force measurement device such that the force measurement device measures the force being applied to the belt by the probe element. Using the system, a force is applied to the upper surface of the belt either until the belt is displaced by a predetermined amount or until a predetermined force is applied. The belt tension may then be determined by comparing the displacement and force to the displacement and force that is specified for the belt or belt system.

A first embodiment of a method of checking belt tension includes providing a reference indicator defining a reference position relative to the upper surface of the belt in an undeflected state. A force/probe assembly is provided and is operable to measure a force. The assembly has measurement markings disposed thereon, and a distal end, and is configured to measure a force applied to the distal end. The distal end of the force/probe assembly is positioned on the upper surface of the belt at a midpoint of the span and a force is applied generally perpendicularly to the upper surface of the belt using the force/probe assembly. In one approach, the belt is deflected a predetermined distance, as determined by a change in position of the measurement markings relative to the reference indicator, and the force applied generally perpendicularly to the outer surface using the force/probe assembly is measured. In another approach, the belt is deflected using the force/probe assembly until the force applied generally perpendicularly to the upper surface is equal to a predetermined force, and the deflection of the belt is measured, as determined by a change in position of the measurement markings relative to the reference indicator. The belt tension is determined based on the force and distance during the deflecting step.

In an example, the force/probe assembly includes a force measurement device operable to measure a force and a probe element having the measurement markings disposed thereon, the probe element having an end defining the distal end of the force/probe assembly. The probe element is connected with the force measurement device such that a force applied to the end of the probe element is measured by the force measurement device.

A linear position of the measurement markings of the probe element may be adjustable relative to the distal end of the force/probe assembly, and the method may further include, after the positioning step, adjusting the linear position of the measurement markings relative to the distal end until the reference indicator is aligned with a zero location of the measurement markings.

The probe element may have a shaft and a measurement element movably received on the shaft, the measurement element having the measurement markings disposed thereon. The zero location of the measurement markings may be an end of the measurement element.

The probe element may have an indicator movable relative to the measurement markings, and the method may further include positioning the indicator at a predetermined position prior to the applying step, the position corresponding to the predetermined deflection of the belt.

The probe element may be separable from the force measurement device and the method may further include disposing the probe element on the force measurement device such that a force applied to the end of the probe element is measured by the force measurement device.

In some examples, the step of providing the reference indicator includes providing a first laser alignment element operable to project laser light in a plane and positioning the first laser alignment element such that the laser light in the plane is projected generally parallel to the upper surface of the belt in the undeflected state. The change in position of the measurement markings relative to the reference indicator is the change in position of the measurement markings relative to the projected laser light. In some examples, a second laser alignment element is provided and is operable to project laser light in a plane. The second laser alignment element is positioned such that the laser light projected by the second laser alignment element is generally in the same plane as the laser light from the first laser alignment element.

The steps of positioning the first and second laser alignment elements may include attaching the alignment elements to respective ones of the two or more pulleys such that the alignment elements project light towards each other.

In some examples, a first and second support bracket are provided, and the step of attaching the alignment elements to the respective pulleys includes attaching a respective one of the support brackets to each pulley and attaching each alignment element to the respective support bracket. The first and second support brackets may be right-angle brackets each having a first surface attachable to a face of a pulley and a second surface at a right angle to the first surface, the second surface of each support bracket supporting a respective one of the alignment elements. The support brackets may each have magnets for magnetically attaching to the face of the respective pulley.

In some examples, the measurement markings of the force/probe assembly include displacement markings and span markings corresponding to the displacement markings, the displacement marking associated with each span marking indicating a displacement to be used for the respective span indicated by the span marking.

A further embodiment of a method of checking belt tension includes providing a reference indicator defining a reference position relative to the upper surface of the belt in an undeflected state. A force/probe assembly is provided and has a proximal end, an opposed distal end, and length defined therebetween. The assembly is operable to measure a force applied to the distal end. The distal end of the force/probe assembly is positioned on the upper surface of the belt at a midpoint of the span and a force is applied generally perpendicular to the upper surface of the belt using the force/probe assembly. In one approach, the belt is deflected a predetermined distance, as determined by a change in position of the force/probe assembly relative to the reference indicator, and the force applied generally perpendicularly to the outer surface using the force/probe assembly is measured. In another approach, the belt is deflected using the force/probe assembly until the force applied generally perpendicularly to the upper surface is equal to a predetermined force, and the deflection of the belt is measured, as determined by a change in position of the force/probe assembly relative to the reference indicator. The belt tension is determined based on the force and distance during the deflecting step. During the deflecting step, the length of the force/probe assembly remains the same.

In an example, the force/probe assembly further includes measurement markings disposed along at least a portion of the length and the change in position of the force/probe assembly relative to the reference indicator is determined by a change in position of the measurement markings relative to the reference indicator. During the deflecting step, a position of the measurement markings relative to the distal and proximal ends remains fixed.

In an example, the linear position of the measurement markings of the force/probe assembly are adjustable relative to the distal end of the force/probe assembly, and the method further includes, after the positioning step and before the force applying step, adjusting the linear position of the measurement markings relative to the distal end until the reference indicator is aligned with a zero location of the measurement markings. The linear position of the measurement markings relative to the distal end remains fixed during the force applying and deflecting steps. The force/probe assembly may have a shaft and a measurement element movably received on the shaft, with the measurement element having the measurement markings disposed thereon. The zero location of the measurement markings may be the end of the measurement element.

In an example, the force/probe assembly has an indicator movable relative to the measurement markings, and the method further includes positioning the indicator at a predetermined position prior to the applying step, the position corresponding to the predetermined deflection of the belt. This indicator remains fixed relative to the proximal and distal ends of the assembly during the deflecting and force applying steps.

In an example, the force/probe assembly comprises includes a force measurement device operable to measure a force and a probe element having an end defining the distal end of the force/probe assembly. The probe element is connected with the force measurement device such that a force applied to the end of the probe element is measured by the force measurement device. The probe element may be separable from the force measurement device and the method may further include disposing the probe element on the force measurement device such that a force applied to the end of the probe element is measured by the force measurement device.

In an example, the step of providing the reference indicator includes providing a first laser alignment element operable to project laser light and positioning the first laser alignment element such that the laser light is projected above the upper surface of the belt in the undeflected state so as to define the reference position.

The force/probe assembly may include at least one light sensor disposed between the distal and proximal ends, and the change in position of the force/probe assembly relative to the reference indicator is determined by the at least one light sensor sensing the laser light at a position along the length of the force/probe assembly corresponding to the change in position. The at least one light sensor may be a light sensor operable to sense a position of laser light along at least a portion of the length of the force/probe assembly, and the change in position of the force/probe assembly relative to the reference indicator may be determined by a change in position of the laser light along the portion of the length during the deflecting step.

The step of providing the reference indicator may further include providing a second laser alignment element operable to project laser light, and positioning the second laser alignment element such that the laser light projected by the second laser alignment element is generally coplanar with the laser light from the first laser alignment element. The steps of positioning the first and second laser alignment elements may include attaching the alignment elements to respective ones of the two or more pulleys such that the alignment elements project laser light towards each other.

In an example, the method further includes wirelessly transmitting force and/or deflection and/or belt tension information from the force/probe assembly.

In an example, the force/probe assembly is further operable to provide a visual and/or audible indication when a predetermined distance of deflection or a predetermined application of force occurs, and the method further includes providing the indication when the predetermined distance of deflection or a predetermined application of force occurs.

In an example, the force/probe assembly is further operable to display and/or store the force and/or deflection.

In an example, a first and second support bracket are provided, and the step of attaching the alignment elements to the respective pulleys includes attaching a respective one of the support brackets to each pulley and attaching each alignment element to the respective support bracket. The first and second support brackets are right-angle brackets each having a first surface attachable to a face of a pulley and a second surface at a right angle to the first surface, and the second surface of each support bracket supports a respective one of the alignment elements. The support brackets may each have magnets for magnetically attaching to the face of the respective pulley.

DETAILED DESCRIPTION OF THE PREFERRED EMBODIMENTS

The present system and method for measuring belt tension is for use with a system having a belt extending over two or more pulleys, with a span defined between the pulleys. In an embodiment, a reference indicator is provided to define a reference position relative to an upper surface of the belt in an undeflected state. This reference indicator may take various forms, with one version including one or more laser alignment elements which project laser light in a plane. The light defines the reference position. In an example, the laser alignment elements are attached to the pulleys and are positioned to project light at each other generally in the same plane. Alternatively, only a single laser element may be attached to a pulley or supported in other ways. A probe element has a distal end used to apply a force generally perpendicularly to the upper surface of the belt at a midpoint of the span. In one embodiment, the probe element has measurement markings thereon and, as the probe element is used to apply force to the belt, the position of these measurement markings moves relative to the reference position, thereby allowing a user to determine how much the belt has been displaced. The probe element is connected to a force measurement device such that the force measurement device measures the force being applied to the belt by the probe element. Using the system, a force is applied to the upper surface of the belt either until the belt is displaced by a predetermined amount or until a predetermined force is applied. The belt tension may then be determined by comparing the displacement and force to the displacement and force that is specified for the belt or belt system.

Figure 1:
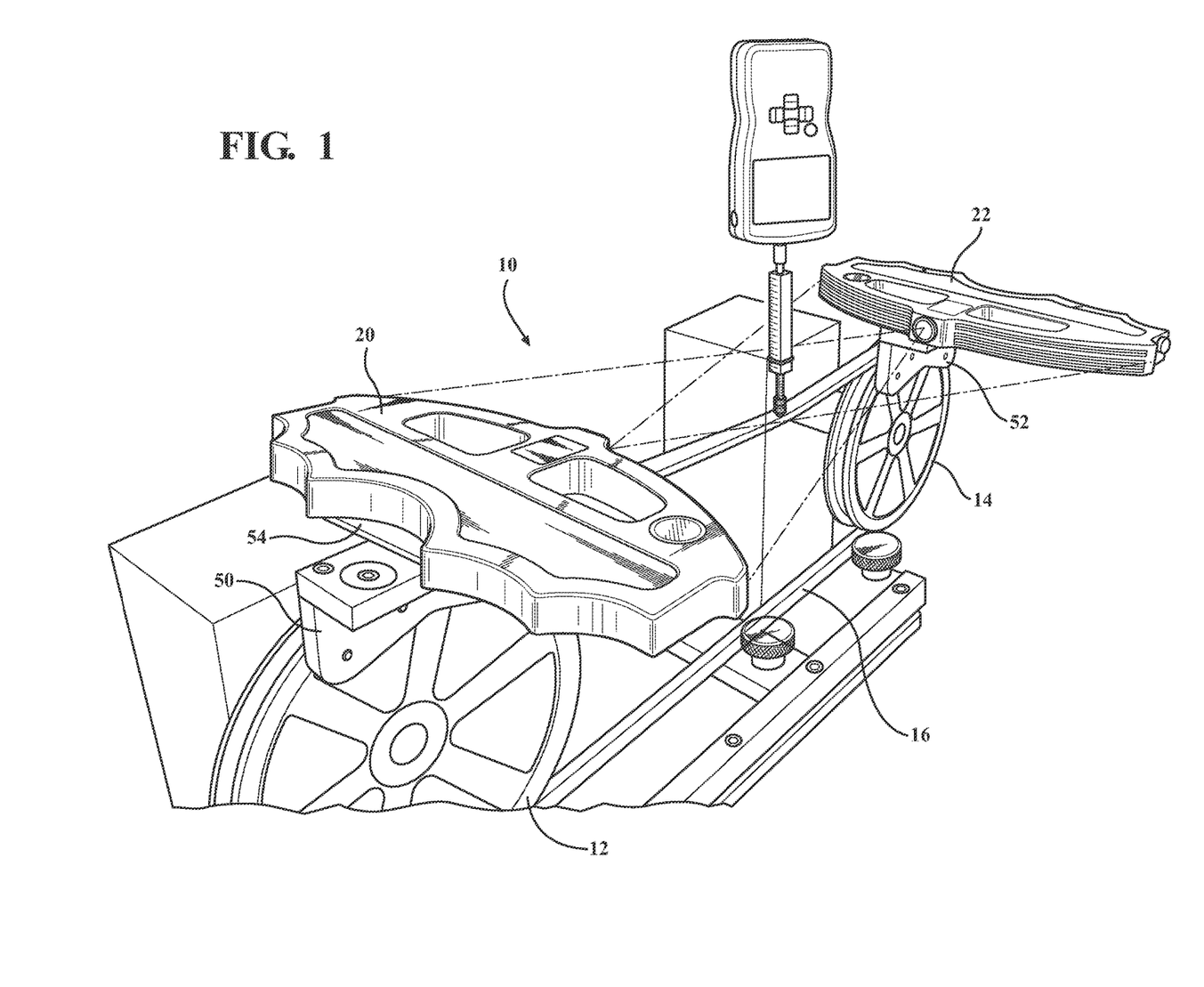
FIG. 1 is a perspective view of an exemplary system for practicing the method according to an embodiment of the present invention.
Figure 2:
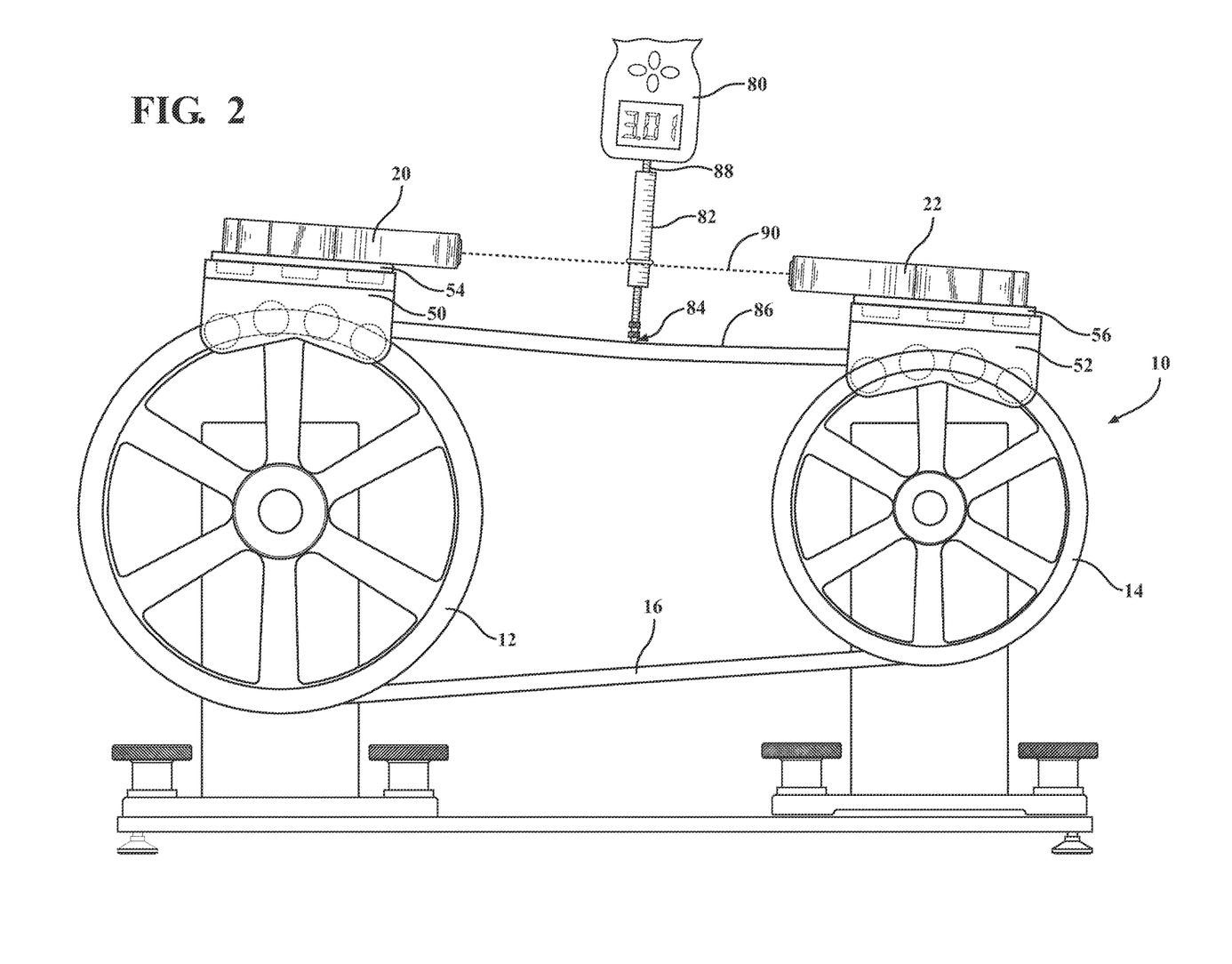
FIG. 2 is a front view of the system of FIG. 1.

Turning now to FIGS. 1 and 2, an exemplary system and method will be described. A power transmission assembly 10 is represented by a first pulley 12, a second pulley 14, and a belt 16 extending between the pulleys. The illustrated power transmission assembly 10 is a training device for training technicians to properly align and tension pulley systems, but those of skill in the art will recognize that the assembly 10 is analogous to a wide range of assemblies having two or more pulleys and belts of various types extending between the pulleys. An example assembly would include an electric motor having a first pulley and a machine having a second pulley and a belt providing power from the electric motor to the machine.

Generally, to determine whether the tension in the belt is appropriate, the belt is deflected by a predetermined amount and the force required to achieve this deflection is compared to a specification for the belt or assembly. The displacement used may be based on the span between the pulleys. Typically, the displacement is $1/64^{th}$ inch per inch of span. For example, in a system where the span is 50 inches, the specification may indicate that a predetermined displacement of $50/64$ths of an inch (slightly more than three quarters of an inch) is used and the associated force is 10 pounds. If the belt is displaced by $3/4"$ and the force is less than 10 pounds, the belt tension is too low. If the force is greater than 10 pounds, the tension is too high. As will be clear to those of skill in the art, this is a form of measuring belt tension, even if a tension force along the belt is not actually measured or calculated. As used herein, the term "measuring belt tension" may take the form of determining the displacement and force and determining if the force matches, exceeds, or is below a specified level. Those of skill in this art will understand how to determine belt span. Generally, the span is the distance between the tops of the pulleys, with top being defined relative to the plane of the belt.

As will also be clear to those of skill in the art, the belt tension could be measured (i.e. determined to be correct, high or low) by applying a predetermined force and measuring the displacement. If the displacement is too large for the specified force, the tension is low; if the displacement is too small, the tension is high.

In FIGS. 1 and 2, the reference indicator takes the form of a first laser alignment element 20 and a second laser alignment element 22. The laser alignment elements may also be used for pulley alignment as described in the inventor's issued U.S. Pat. No. 9,285,215, the entire contents of which is incorporated herein by reference. The laser alignment elements are referred to as laser alignment tools in the earlier patent.

Figure 3:
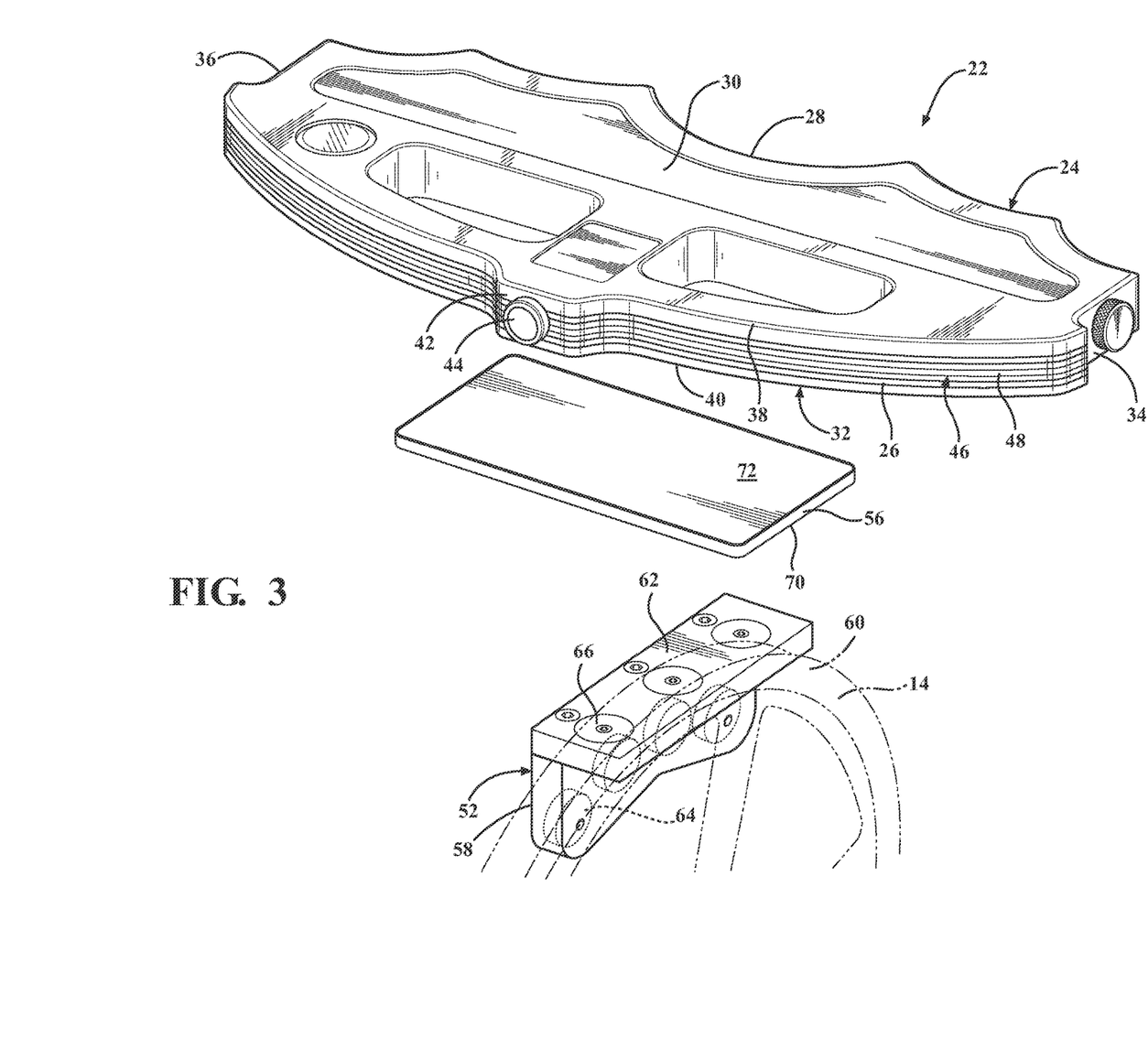
FIG. 3 is a perspective view of portions of an alignment element for use with some embodiments of the present invention.

The second laser alignment element 22 is shown in more detail in FIG. 3 and will be further described. Each of the laser alignment elements may take this form, or may take other forms providing similar functionality. Laser alignment element 22 is provided with a housing 24 defined by an arcuate front surface 26 and an opposed rear surface 28, both of which extend between a top surface 30 and a bottom surface 32. A first side surface 34 and an opposed second side surface 36 each extend between the front 26, rear 28, top 30 and bottom 32 surfaces. In some versions, the top and bottom surfaces are parallel to each other and the arcuate front surface 26 and rear surface 28 are both perpendicular to the top and bottom surfaces. As such, portions of the front surface 26 and rear surface 28 may be parallel to each other. The arcuate front surface 26 may be said to have a top end 38 adjacent the top surface 30 and a bottom end 40 adjacent the bottom surface 32. A central region 42 is defined between the top end 38 and bottom end 40 and an aperture 44 is disposed in the central region 42. In the illustrated embodiment, the arcuate front face 26 is smoothly curved between the two sides 34 and 36 with the central region 42 projecting slightly from the curved surface. The curved surface may be of a constant radius or arc or may be curved in other ways. The term "arcuate" should be interpreted to mean a curved surface and is not limited to a constant arc. Further, the curved surface is curved from the side 34 to the side 36, not from the top surface 30 to the bottom surface 32. Most or all of the front surface 26 is preferably flat from the top surface 30 to the bottom surface 32 and perpendicular to these surfaces. As shown, the front surface is curved outwardly, so may be considered a convexly arcuate front surface.

As will be described in more detail below, a laser light source is disposed in the body of laser alignment element 22 and configured to project a sheet or plane of laser light from the aperture 44. When two laser alignment elements are used as shown in FIGS. 1 and 2, the sheet of laser light from the second laser alignment element 22 illuminates the arcuate front surface of the first laser alignment element 20 and the sheet of laser light from the first laser alignment element 20 illuminates the arcuate front surface 26 of the second laser alignment element 22.

Referring again to FIG. 3, the arcuate front surface 26 is further provided with a target pattern 46 disposed thereon. In some embodiments, target pattern 46 is a plurality of lines 48 disposed parallel to one another running lengthwise along the arcuate front surface 26. The plurality of lines 48 may comprise a plurality of patterned color scheme alignment strips extending parallel with the elongated axis of the arcuate front surface 26. A central one of the lines 48 of the target pattern 46 may be white to clearly display a laser line when illuminated by the sheet of laser light of the other laser alignment element. When two laser alignment elements are coplanar with each other, the sheet of laser light from each will illuminate the central line of the target pattern of the other laser alignment element. If the two laser alignment elements are not coplanar, the position of the sheet of light on each front surface may be referenced to allow adjustment until the elements are coplanar.

In order to support the laser alignment elements 20 and 22 in a position to define the reference position, they may be attached to the pulleys 12 and 14, respectively, as shown in FIGS. 1 and 2. In an embodiment, the reference indicator may further include, in addition to the laser alignment elements 20 and 22, support brackets and support plates. FIGS. 1 and 2 illustrate the first laser alignment element 20 being supported by support bracket 50 and support plate 54 and second laser alignment element 22 supported by support bracket 52 and support plate 56. The support bracket 52 and support plate 56 will be described in more detail with reference to FIG. 3.

FIG. 3 shows the second laser alignment element 22, the support bracket 52, and the support plate 56 separated for clarity, along with a portion of pulley 14 in phantom line. The bracket 52 is a right-angle bracket having a first surface 58 attachable to a face 60 of the pulley 14 and a second surface 62 at a right angle to the first surface 58. The lower part (in the illustrated orientation) includes the first surface 58 and has a plurality of magnets 64 for magnetically attaching the first surface to the face 60 of the pulley 14. The upper part includes the second surface 62 and also includes a plurality of magnets 66. The laser alignment element 22 may have its own magnets for magnetically attaching to a surface and/or may be supported on the second surface 62, thereby positioning the laser alignment element 22 in a plane perpendicular to the face 60 of the pulley 14. However, the support plate 56 may also be used, to provide more flexibility in positioning the laser alignment element 22 and providing a larger support surface. As shown, the support plate 56 is a planar element, typically formed of ferromagnetic material, with a lower surface 70 and an opposed parallel upper surface 72. The support plate 56 is magnetically attached to the second surface 62 of the bracket 52 and the laser alignment element may be magnetically attached to the upper surface 72 of the support plate 56.

In use, the support brackets 50 and 52 are magnetically attached to the faces of the pulleys 12 and 14, respectively, the support plates 54 and 56 are magnetically attached to the brackets 50 and 52, respectively, and the laser alignment elements 20 and 22 are magnetically attached to support plates 54 and 56, respectively. The positions are then adjusted until the laser alignment elements 20 and 22 are coplanar. The coplanar laser sheets projected by the laser alignment elements 20 and 22 then cooperate to define a reference laser sheet or line, which defines the reference position for practicing an embodiment of the present invention. The reference laser sheet is typically a short distance above the upper surface of the belt and generally parallel thereto, though it is not required that the laser sheet be parallel to the belt surface as long as the laser sheet provides a reference position relative to the upper surface to allow displacement measurements. It is noted that these steps are typically performed after aligning the pulleys in accordance with the inventor's earlier patent.

FIG. 2 shows a force measurement device 80 with a probe element 82 attached thereto. The probe element is a generally elongated element having a distal 84 end that is positioned on the upper surface 86 of the belt 16 to apply a force to the upper surface, preferably generally perpendicularly to the upper surface 86 so as to deflect the belt downwardly (in the illustrated orientation) to determine belt tension. A proximal end 88 of the probe element is attached to the remainder of the force measurement device. The probe element may form part of the force measurement device, be integral therewith, or be detachable therefrom. The force measurement device 80 may take a variety of forms, with the illustrated embodiment including a display operable to show the force being exerted through the probe element onto the upper surface of the belt. The laser light from the laser alignment elements 20 and 22 is represented by a dashed line 90; the light illuminates the sides of the probe element 82 so that movement of the probe element relative to the light can be observed. The combination of the force measurement device and the probe element may be referred to as a force/probe assembly. This assembly may be an integrated probe and force measurement device with the measurement markings thereon. As an example, the assembly could look like an elongated probe with the force measurement functionality built into the probe itself.

In FIGS. 1 and 2, the belt 16 is a single belt, to represent the simplest use of the present invention. However, the invention may also be used with more complex systems including, but not limited to, banded belts such as the belt 92 in FIG. 4. Such a belt comprises a plurality of V-belts that are banded together by a top element. Belt tension is checked in a manner similar to a single V-belt except that more force is typically required and it is helpful to spread this force over the span of the banded belt. For this purpose, a bar 94 may be provided for spreading the load from the probe element 82 over the entire belt. In the illustrated embodiment, the bar 94 has a recess at a midpoint for receiving the distal end 84 of the probe element 82.

Figure 4:
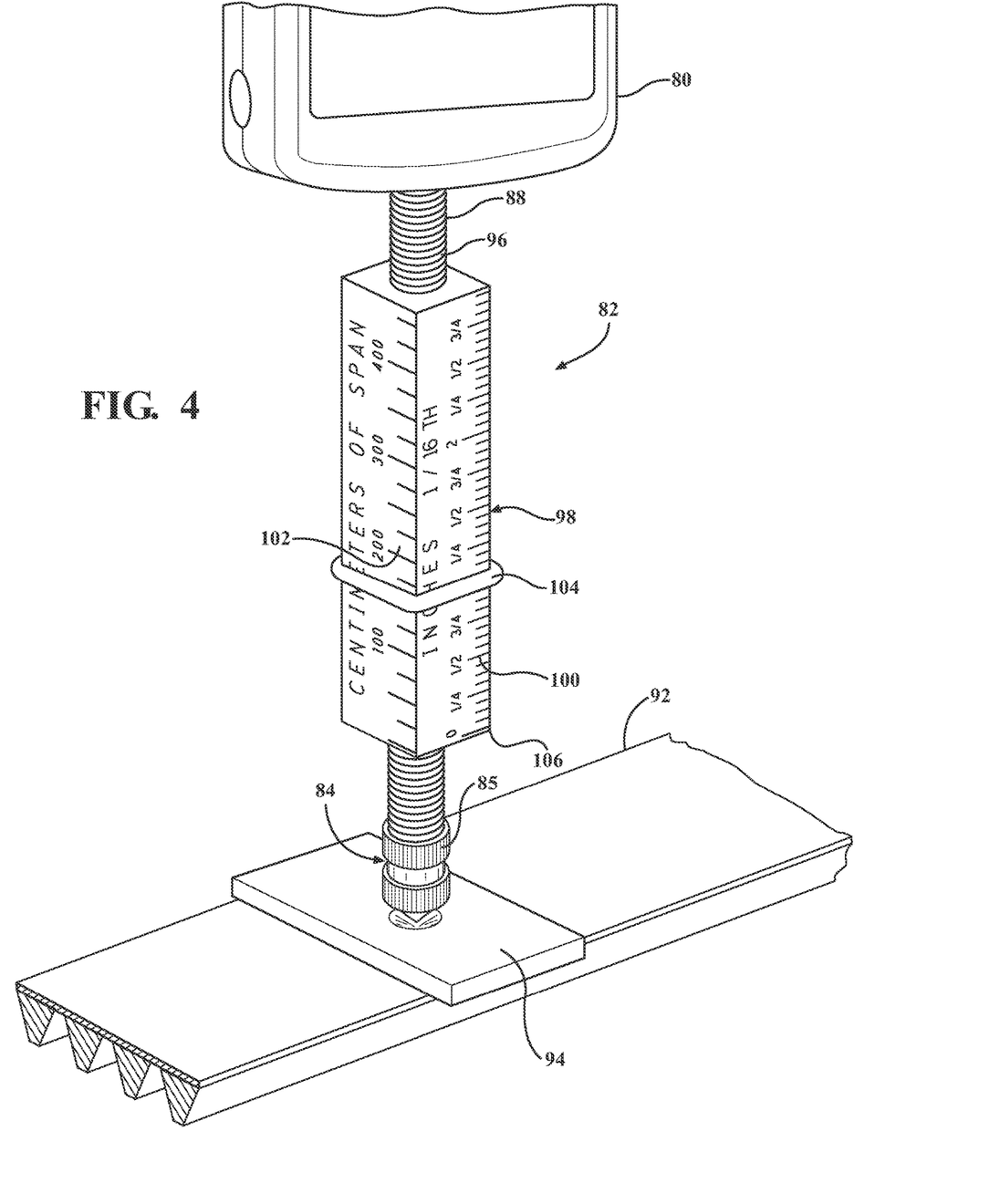
FIG. 4 is perspective view of an embodiment of a force/probe assembly for use with some embodiments of the present invention.

FIG. 4 will be referred to for further details of an embodiment of the probe element 82. In this embodiment, the probe element 82 has a threaded shaft 96 extending from the distal end 84 to the proximal end 88 and a measurement element 98 that is received onto the shaft and may be adjusted upwardly and downwardly. In this example, the measurement element 98 is square in cross-section so as to have 4 side surfaces. The measurement element 98 has a first set of measurement markings 100 on one of the sides and a second set of measurement markings 102 on another of the sides. In this example, the first set of markings 100 are displacement markings in inches while the second set of measurement markings are indications of span in centimeters. Additional sides may provide displacement markings in metric units and span in inches. In certain uses of the present invention, the span between the pulleys determines the predetermined displacement required for checking belt tension. That is, for a belt having a given span, a corresponding displacement is always used and the force is provided by a specification. In the illustrated example, a user may determine the displacement required by reference to the span markings. An adjustable indicator 104 is provided on the measurement element 98 and may be moved upwardly or downwardly to indicate a position to be used in the method of the present invention. In FIG. 4, the indicator 104 is positioned at approximately 1 inch of displacement, corresponding to a little more than 150 centimeters of span. Typically, the displacement is $1/64^{th}$ inch per inch of span. In the illustrated example, 150 centimeters of span is approximately 59 inches, so the displacement is $59/64^{th}$ of an inch. In one example, the indicator is a rubber ring that may be slid or rolled upwardly and downwardly on the measurement element 98, but the indicator may take a variety of forms. In the illustrated embodiment, the distal end 84 of the probe element may have a collar 85 to prevent the measurement element from being threaded off the end of the threaded shaft. The lower end of the measurement element may have a recess to allow the collar 85 to be received into the body of the measurement element such that the lower end is close to the distal end 84 for certain measurements.

In the illustrated embodiment, the lower end 106 the measurement element 98 is a zero location for the displacement markings 100. In use, the distal end 84 of the probe element 82 is positioned on the upper surface 86 of the belt, generally perpendicularly thereto and at a midpoint of the span, as shown in FIG. 2. With the distal end 84 just touching the belt, but not displacing the belt, the measurement element 98 is rotated on the shaft 96 until the lower end 106 is at the reference position defined by the light 90. With the indicator 104 set to the predetermined displacement, a force is applied generally perpendicularly to the upper surface 86 of the belt, using the probe element. The force is increased until the displacement reaches the predetermined displacement, as indicated by the indicator 104. That is, as the belt is displaced, the light 90 will illuminate the displacement markings 100 allowing a user to determine when the predetermined displacement has been reached. The force, as determined by the force measurement device 80, is then read or recorded. In some examples, the force measurement device will record the maximum force applied.

As will be clear to those of skill in the art, the force probe assembly has a fixed length that does not change during application of force to the belt. Also, the position of the measurement markings, relative to the proximal and distal ends of the assembly, does not change during the application of force to the belt and deflection of the belt. In the illustrated embodiment, the measurement element 98 may be repositioned relative to the distal end, just as by rotating the measurement element, but this repositioning is done before the step of applying a force to the belt, and during the force applying step the position of the measurement element is static. Therefore, the linear position of the measurement markings, relative to the distal end, also does not change during the application of force.

As mentioned previously, it would be possible to check tension by applying a predetermined force and then checking the displacement. The force measurement device 80 may be set to beep or provide other types of indication when a predetermined force is reached and the user may then observe the corresponding displacement.

A variety of alternatives are also available. In one embodiment, the indicator 104 includes a light sensor operable to determine when the light 90 illuminates the indicator. The indicator may then provide an audible alert or may communication wirelessly or through a wired connection, either to an external device or to the force measurement device, allowing a tension check without directly observing the light 90 on the measurement markings 100. In a further embodiment, the probe element may have a sensor operable to sense a position along the probe that is being illuminated, so as to determine displacement along the length. Such a sensor could take the form of a plurality of discrete sensors or a continuous sensor. Again, the sensor may provide an alert or communicate with an external device or the force measurement device. As yet another embodiment, a sensor may be provided for reading the measurement markings on the probe element to allow the sensor to determine the displacement. The measurement markings may include machine-readable markings that are read by a video sensor, thereby determining the position of the light on the markings. Such a sensor may be integrated into one or more of the laser alignment devices for directly determining displacement.

Figures 5, 6:
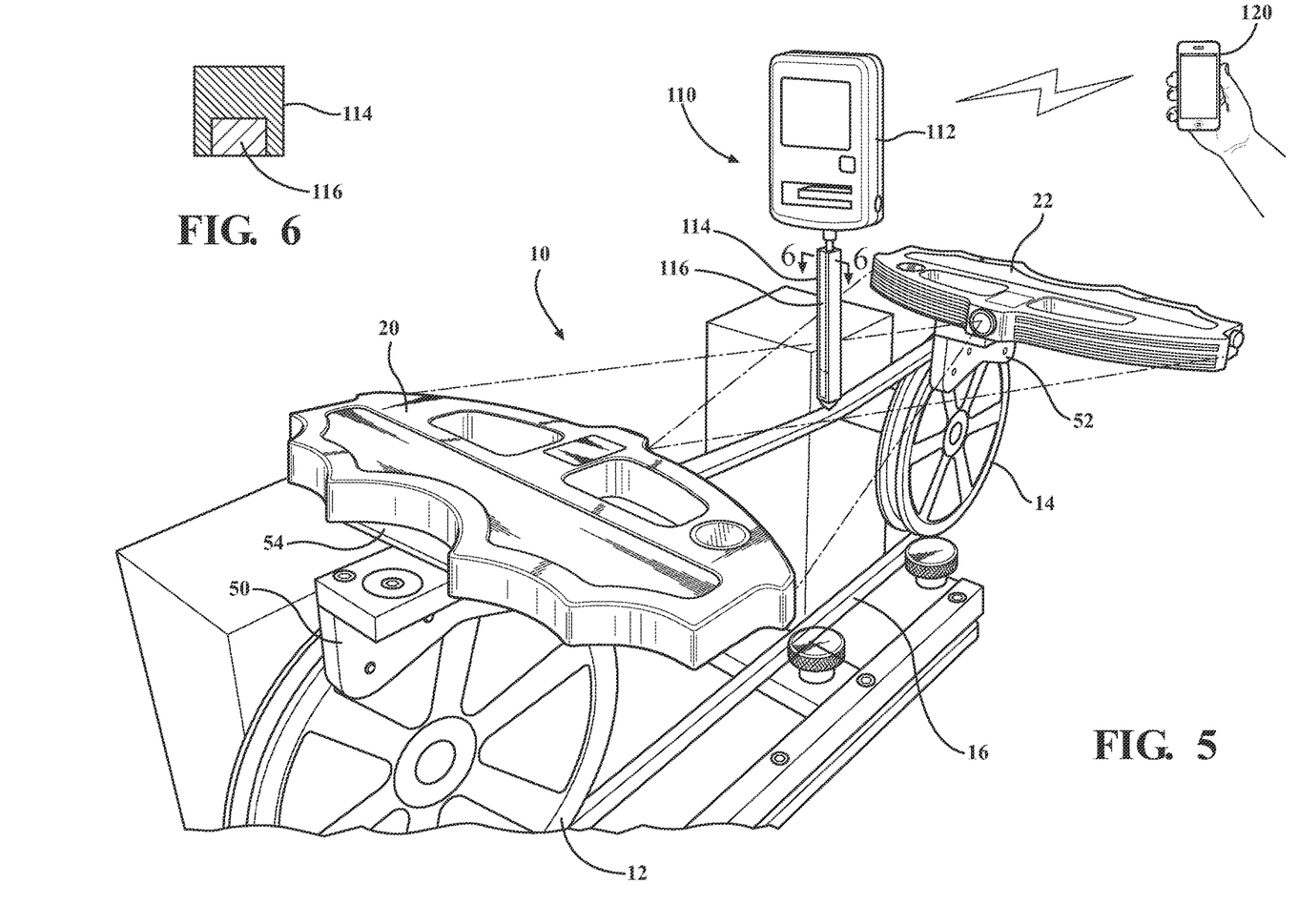
FIG. 5 is a perspective view of a further exemplary system for practicing a method according to an embodiment of the present invention.
FIG. 6 is a cross sectional view taken along lines 6-6 in FIG. 5.

Referring to FIGS. 5 and 6, an embodiment with a light sensor will be described in more detail. FIG. 5 shows a system with elements similar to in FIGS. 1 and 2, and like numbers are used. In this embodiment, the force/probe assembly is shown and 110 and includes a display portion 112, which may incorporate the force measurement functionality, and a probe portion 114, which may be integral with the overall assembly or separable from the display portion 112. In this embodiment, one or more light sensors 116 are disposed in the probe portion for sensing a position of the light from the laser elements. The light sensor may be a linear PSD (position sensitive detector), which is an optical sensor that senses where light is received along the length of the sensor. FIG. 6 shows a cross section of the probe portion 114 with the PSD 116 embedded therein. Alternatively, one or more discrete sensors may be provided. Any type of light sensor operable to provide position sensing at one or more positions along the probe element may be used. In one example, the assembly 110 senses the light position when the distal end is positioned into contact with the belt, which is when the force sensed may change from zero or a non-contact reading. The, force is applied and the position of the light on the light sensor 116 will move along the length of the sensor. The assembly 110 may determine when a predetermined force is reached and record the change in position, thereby determining displacement, and/or may determine when a predetermined displacement is reached and record the force. A curve or table of force versus displacement may also be determined. This embodiment allows for very quick readings, and may not require the operator to do anything more than position the assembly against the belt and apply force. The assembly may provide an audio or visual signal when a measurement is complete. The assembly 110 may also wirelessly communication with a device such as a phone 120, tablet, computer, or other device, with the wirelessly connected device serving as a display, memory, or other functions of the system. The device may include information on specifications to assist in determining proper readings. In some examples, the assembly 110 may lack a display, and instead rely on the wirelessly connected device to display readings. The assembly 110 or device 120 may determine a location, such as by using GPS, and tag the measurements for later reference. Position information, or wirelessly communicated information from the equipment being tested, may also be used to determine specifications for the belt being tested. The assembly 110 and/or device 120 may provide feedback to a user as to how to adjust the equipment to achieve a proper tension, such as indicating that the tension is too high or too low and by how much, and how much to move on pulley to achieve a correct reading.

As mentioned previously, the invention may be practiced with a single laser alignment element, 20 or 22, as long as it provides a reference position on the probe. Further, other types of reference indicators may be used, though a laser light source is preferred. As examples, the reference indicator may be a straight edge extending between the pulleys, may be an adjacent belt (where the upper surface of the adjacent belt defines the reference position) or other approaches may be used.

Terms such as "generally parallel" and "generally perpendicular" have been used herein. As used herein, the term "generally" should be interpreted as sufficiently close to allow the invention to be practiced. For example, as will be clear to those of skill in the art, it is desirable to apply the displacement force to the belt in a direction perpendicular to the surface of the belt. However, it is not necessary that the force be applied absolutely perpendicularly in order to obtain a reliable indication of belt tension. As such, "generally perpendicular" should be interpreted as being close enough to perpendicular to provide results that are acceptable within the industry. While being within a few degrees of perpendicular is idea, errors of five or even ten degrees or more degrees may not cause unacceptable errors in tension checking. Further, while it is desirable to apply the force at the center of the span, the term "midpoint" has been used herein to indicate a location near enough to the center to provide acceptable results.

As will be clear to those of skill in the art, the herein described embodiments of the present invention may be altered in various ways without departing from the scope or teaching of this disclosure. As such, this disclosure should be interpreted broadly. The following claims define the scope of some embodiments.

The invention claimed is:

1. A method of checking belt tension of a belt extending between two or more pulleys, the belt having an upper surface and a span between the pulleys, the method comprising the steps of:
    providing a reference indicator defining a reference position relative to the upper surface of the belt in an undeflected state;
    providing a force/probe assembly having a proximal end, an opposed distal end, and length defined therebetween, the assembly being operable to measure a force applied to the distal end;
    positioning the distal end of the force/probe assembly on the upper surface of the belt at a midpoint of the span;
    applying a force generally perpendicular to the upper surface of the belt using the force/probe assembly;
    either:
        deflecting the belt a predetermined distance, as determined by a change in position of the force/probe assembly relative to the reference indicator, and measuring the force applied generally perpendicularly to the outer surface using the force/probe assembly; or
        deflecting the belt using the force/probe assembly until the force applied generally perpendicularly to the upper surface is equal to a predetermined force, and measuring the deflection of the belt, as determined by a change in position of the force/probe assembly relative to the reference indicator; and
    determining the belt tension based on the force and distance during the deflecting step;
    wherein during the deflecting step, the length of the force/probe assembly remains the same.

2. The method according to claim 1, wherein:
    the force/probe assembly further comprises measurement markings disposed along at least a portion of the length;
    the change in position of the force/probe assembly relative to the reference indicator is determined by a change in position of the measurement markings relative to the reference indicator; and
    wherein during the deflecting step a position of the measurement markings relative to the distal and proximal ends remains fixed.

3. The method according to claim 2, wherein:
    a linear position of the measurement markings of the force/probe assembly are adjustable relative to the distal end of the force/probe assembly; and
    the method further comprises, after the positioning step and before the force applying step, adjusting the linear position of the measurement markings relative to the distal end until the reference indicator is aligned with a zero location of the measurement markings;
    wherein the linear position of the measurement markings relative to the distal end remains fixed during the force applying and deflecting steps.

4. The method according to claim 3, wherein the force/probe assembly has a shaft and a measurement element movably received on the shaft, the measurement element having the measurement markings disposed thereon.

5. The method according to claim 4, wherein the zero location of the measurement markings is an end of the measurement element.

6. The method according to claim 2, wherein:
    the force/probe assembly has an indicator movable relative to the measurement markings; and
    the method further comprises positioning the indicator at a predetermined position prior to the applying step, the position corresponding to the predetermined deflection of the belt.

7. The method according to claim 1, wherein the force/probe assembly comprises:
    a force measurement device operable to measure a force;
    a probe element having an end defining the distal end of the force/probe assembly, the probe element being connected with the force measurement device such that a force applied to the end of the probe element is measured by the force measurement device; and
    the probe element being separable from the force measurement device and the method further includes disposing the probe element on the force measurement device such that a force applied to the end of the probe element is measured by the force measurement device.

8. The method according to claim 1, wherein:
    the step of providing the reference indicator comprises:
        providing a first laser alignment element operable to project laser light; and
        positioning the first laser alignment element such that the laser light is projected above the upper surface of the belt in the undeflected state so as to define the reference position.

9. The method according to claim 8, wherein:
the force/probe assembly further includes at least one light sensor disposed between the distal and proximal ends; and
the change in position of the force/probe assembly relative to the reference indicator is determined by the at least one light sensor sensing the laser light at a position along the length of the force/probe assembly corresponding to the change in position.

10. The method according to claim 9, wherein:
the at least one light sensor comprises a light sensor operable to sense a position of laser light along at least a portion of the length of the force/probe assembly; and
the change in position of the force/probe assembly relative to the reference indicator is determined by a change in position of the laser light along the portion of the length during the deflecting step.

11. The method according to claim 8, wherein:
the step of providing the reference indicator further comprises:
providing a second laser alignment element operable to project laser light; and
positioning the second laser alignment element such that the laser light projected by the second laser alignment element is generally coplanar with the laser light from the first laser alignment element.

12. The method according to claim 11, wherein:
the steps of positioning the first and second laser alignment elements comprises attaching the alignment elements to respective ones of the two or more pulleys such that the alignment elements project laser light towards each other.

13. The method according to claim 1, further comprising wirelessly transmitting force and/or deflection and/or belt tension information from the force/probe assembly.

14. The method according to claim 1, wherein:
the force/probe assembly is further operable to provide a visual and/or audible indication when a predetermined distance of deflection or a predetermined application of force occurs; and
the method further comprises providing the indication when the predetermined distance of deflection or a predetermined application of force occurs.

15. The method according to claim 1, wherein the force/probe assembly is further operable to display and/or store the force and/or deflection.

16. The method according to claim 12, further comprising:
providing a first and second support bracket; and
the step of attaching the alignment elements to the respective pulleys comprises attaching a respective one of the support brackets to each pulley and attaching each alignment element to the respective support bracket.

17. The method according to claim 16, wherein the first and second support brackets are right-angle brackets each having a first surface attachable to a face of a pulley and a second surface at a right angle to the first surface, the second surface of each support bracket supporting a respective one of the alignment elements.

18. The method according to claim 17, wherein the support brackets each have magnets for magnetically attaching to the face of the respective pulley.

* * * * *